July 2, 1957 M. RODTZ, JR 2,797,743
STROLLER COVERING
Filed Sept. 20, 1955 2 Sheets-Sheet 1

INVENTOR
MARY RODTZ, JR.
BY
ATTORNEY

July 2, 1957   M. RODTZ, JR   2,797,743
STROLLER COVERING
Filed Sept. 20, 1955   2 Sheets-Sheet 2

INVENTOR
MARY RODTZ, JR.
BY
Charles D. Richard
ATTORNEY

Patent 2,797,743

United States Patent Office

Patented July 2, 1957

2,797,743

STROLLER COVERING

Mary Rodtz, Jr., Staten Island, N. Y.

Application September 20, 1955, Serial No. 535,395

5 Claims. (Cl. 155—182)

This invention has reference to a protecting covering which is especially well adapted for use in carriages of the stroller type and the like carriages which may be easily and readily converted from chair to bed and vice-versa.

Carriages of the type above referred to generally consist of end to end pivoted tubular frame sections to which are attached boards forming respectively a seat, a back rest, and a combined leg and foot rest. To the board forming the seat of the stroller are securely attached two side boards connecting with the upper and lower tubing elements of these sections of the frame to serve for holding the occupant of the carriage against side way movement on the seat board, which is generally covered with a sheet of plastic or similar material.

In carriage of the stroller type, as it is well known, the pivoted sections may be positioned by the simple manipulation of thumb screws to different angular relations to each other to take the form of a chair or moved in substantially horizontal plane to take the form of a bed, as desired.

The object of the present invention is the provision of a covering for use in carriages of the type above mentioned which may be easily placed and secured to the stroller frame or wall sections as a unit whatever the angular position of such wall sections as they are moved to position to form a bed or positioned to form a chair while being easily removed from the carriage whenever necessary as for cleaning and repair.

This invention also contemplates a covering having combining elements or sections which, when folded, form a unit covering adapted to register with respective wall elements of the stroller, while one end of the covering combines with means adapted to form a hood or pocket constructed of elasticized material in order to adjust itself as to fit tightly over the back rest wall section of the stroller at its top disposed end and to take up different transverse lengths of that back rest wall section according to the type and size of the stroller in which the covering may be used.

This invention also contemplates a covering constructed of a material which affords a maximum amount of friction, thereby preventing the occupant from sliding down the seat in an uncomfortable position against the safety strap joining parts of the stroller frame at the front end of the latter, which has been found to occur in any set position of the back and foot rests of the stroller.

Other novel features and advantages of the invention will appear from the following description and by the claims appended thereto, reference being had to the accompanying drawings in which:

Figure 2:
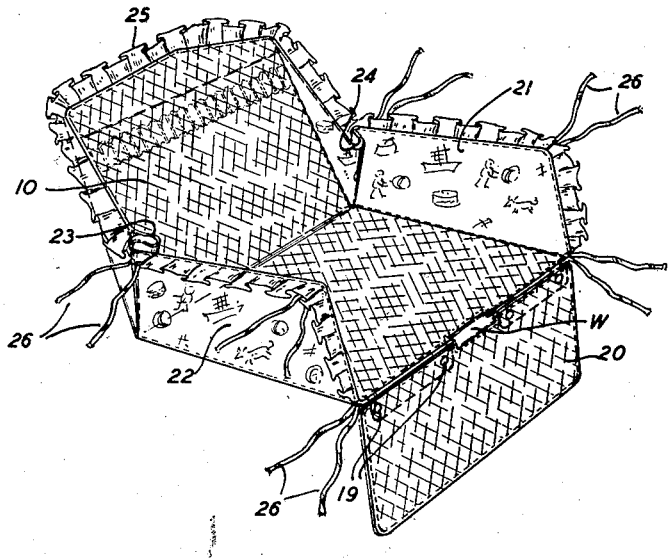
Fig. 2 is a perspective view of the covering, shown folded in the position as to register with the wall elements of the carriage when such elements are positioned to form a chair.
Figure 4:
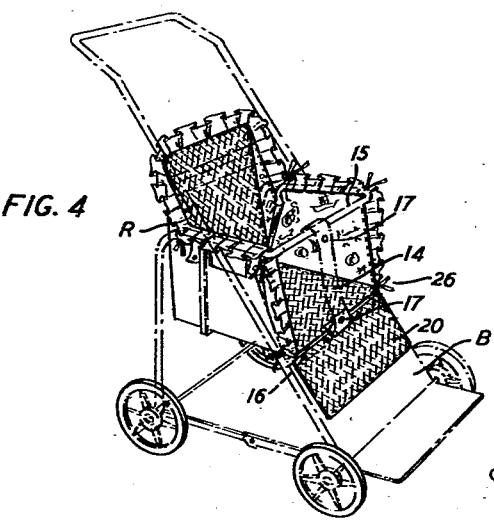
Figure 5:
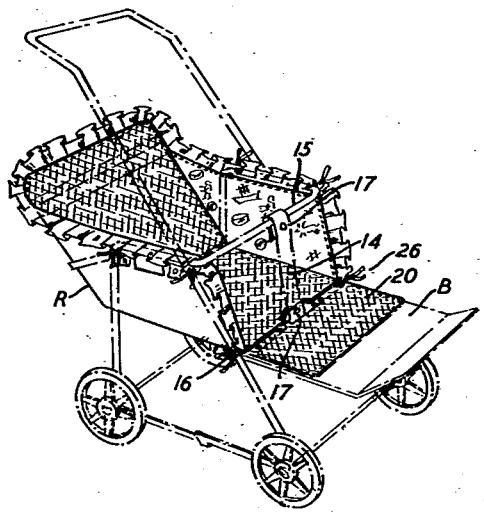

Fig. 4 is a perspective view of the stroller with the covering thereon in a position similar to that of Fig. 2, showing tie strips attached to the sideboard coverings serving to hold the latter in adjusted position to the frame sections of the carriage, and Fig. 5 is a perspective view similar to that of Fig. 4 but showing the leg rest in the raised position and the back rest in a lowered position in the form of a bed.

Figure 3:
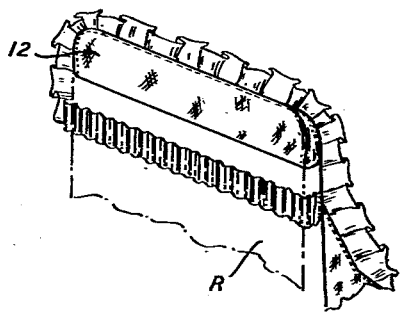
Fig. 3 is a partial rear view showing a hood or pocket made of an elasticized material serving to engage the top end of the stroller back rest with a tensioning action.

The stroller covering of the present invention consists of a substantially rectangularly formed section 10 made of a material having a relatively rough surface, known as quilt, which, unlike plastic material, is not easily responsive to temperature difference to the discomfort of the infant occupying the stroller. Covering section 10 is provided at its end 11, to the underside thereof, with a relatively large strip 12 of elasticized material, best seen in Fig. 3, cooperating with the end 11 of the covering section 10 to form a pocket or hood, so as to permit this end of section 10 to fit tightly over the back rest board R of the stroller while compensating for variation in the transverse dimension of the latter, according to the stroller type with which the covering of the present invention may be used. The other end 13 of covering section 10, at its middle transverse length, is formed with a substantially rectangularly shaped cut away portion forming a passageway W for a safety strap 14, shown in dot and dash lines in Figs. 4 and 5, but which form no part of the present invention, such strap passing over the stroller bars 15 and 16 and secured at both ends to these bars as by similar snap buttons 17 in the ordinary manner.

Figure 1:
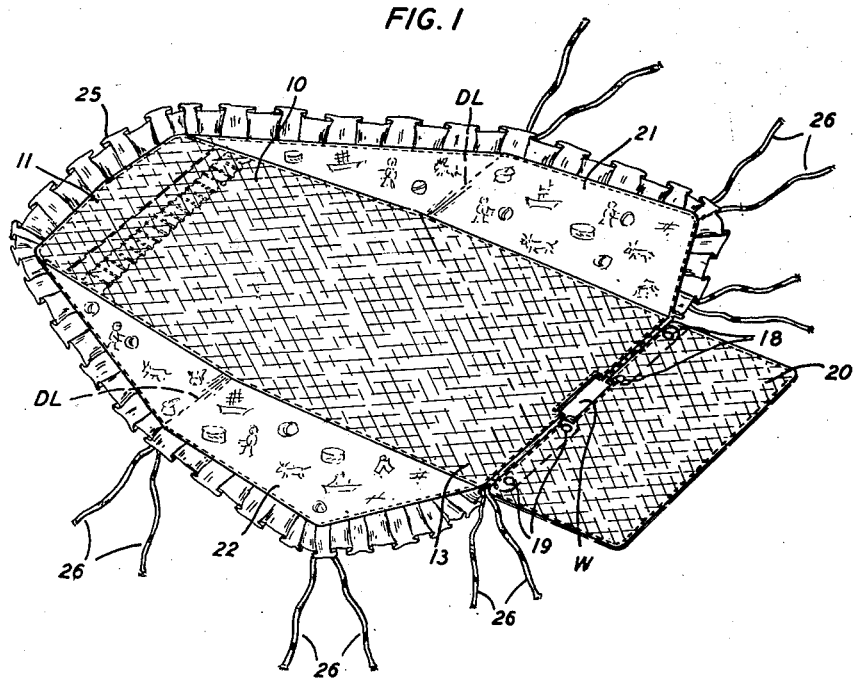
Fig. 1 is a view in perspective of the covering of this invention, developed, showing the leg rest covering section in buttoned position to one end of the main section, the latter combining the seat and the back rest sections with sideboard coverings attached to the sides of the main covering section.

To the end 13 of section 10 is secured, as by pairs of snap buttons 18 and 19, best seen in Figs. 1 and 2, a rectangularly shaped section 20 serving as a partial covering over the leg rest board B of the stroller, and to the lengthwise parallel edges of the covering section 10 are attached, as by sewing the longer side of the trapezium shaped side board covering elements 21 and 22, which may be made of a cloth material suitable either for winter or summer use, as desired. The trapezium shaped side wall covering elements 21 and 22 normally form the covering portions for the elements of the side boards of the stroller, while the portions or elements of the trapezium side wall coverings 21 and 22 which extend from the dotted lines DL, indicated in Fig. 1, to the end 11 of the rectangularly shaped covering section 10 form part or continuation of each of the side wall covering elements 21 and 22, but it is to be noted that when the covering assembly is placed in the position as indicated in Figs. 2, 4 and 5, these portions of the trapezium shaped side walls form folds, as at 23 and 24 substantially cone shaped having their apex at the pivotal point of the back board, so as to permit the development of the covering assembly from the chair position indicated in Figs. 2 and 4 to the bed like position indicated in Fig. 5.

To the peripherally disposed three sides of each of the trapezium shaped side covering elements at the free edges thereof and to the end 11 of the combined seat and back covering portions thus formed are attached, as by sewing, a reenforcing ruffled ribbon 25 and a plurality of pairs of tie strips, as 26, serving to secure the side covering elements 21 and 22 to the side boards or to the supporting frame of the stroller while the lengthwise movement of the combined seat and back rest covering section 10 is effectively prevented by the pocket formed by the elasticized material 12.

Stroller coverings constructed according to the present invention have been found practical in that they are readily and easily placed in position and removed from the stroller carriage for cleaning and when in position they may be positively secured by the pairs of ties to the side boards of the carriage while permitting the back rest and the foot rest elements to be adjusted in any desired position within the capacity of the hinged parts of the carriage and possess a high degree of aesthetic appearance.

What I claim is:

1. A covering for a carriage of the stroller type consisting of a plurality of sections, one of said sections adapted to form a combined seat and back rest, two of said sections being trapezium shaped forming side coverings having their longer side extending along said combined seat and rest sections and sewed at the edges thereof, said side sections adapted to form folds extending from the pivotal point of the back rest board of the carriage to the free edges of said side sections for permitting the conversion of the carriage from a seat to a bed formation and another section forming legs rest covering, the legs rest covering being secured to one end of the combined covering section.

2. A covering for a carriage of the stroller type consisting of a main rectangularly shaped covering section forming respectively a seat and a back rest, trapezium shaped side covering sections having one of their sides extending along the whole length of said main covering section, a leg rest covering section attached to the main section at one end thereof and a transversely disposed strip of elasticized material sewed to the back of the main section at the other end thereof cooperating therewith to form a hood adapted to tightly fit over the back rest board of the carriage for holding said covering in fitted position.

3. A covering for a carriage of the stroller type consisting of a main rectangularly shaped section serving as seat and back rest covering, side covering sections of trapezium shape sewed to the parallel sides of said seat and back rest covering the whole length thereof, a relatively large transversely disposed strip of elasticized material sewed to said main section at one end of the back rest and cooperating therewith to form a hood adapted to fit over the back rest of the stroller for holding said main section against longitudinal movement thereon, and a reenforcing ruffled ribbon sewed to the three other sides of each of said trapezium shaped side sections and to one end of said rectangularly shaped section which forms the back rest of the covering.

4. A covering for a carriage of the stroller type consisting of a main rectangularly shaped plain section of a length to form the seat and the back rest of the covering, a relatively large transversely disposed section of elasticized material sewed to said main section at one end thereof cooperating with the latter to form a hood adapted to fit tightly over the back rest of the stroller, a leg rest section attached to the other end of the main section, the leg rest section and the main section having cooperating means forming a passage way for a safety strap connecting transversely disposed elements of the carriage at the front of the seat thereof, and trapezium shaped side sections having their longer sides equal to the parallel sides of said main section and sewed thereagainst the whole length thereof, said trapezium sections forming extendible means at a point adjacent the pivot of the back rest board of the carriage for permitting conversion of the latter from chair to bed formation.

5. A covering for a carriage of the stroller type, said covering comprising a plurality of sections, one constructed of a single sheet of cloth material having a high coefficient of friction combining a seat covering and a back rest covering formed with parallel sides, the other sections being of trapezium shaped formation serving as side rests, the longer side of said trapezium sections being of a length equal to the added length of both said seat and back rest sections and sewed along the whole length of the parallel sides thereof, each of said side covering sections adapted to form in the chair formation of the carriage substantially conically shaped folds having their apex at the pivotal point of the carriage back rest board and adapted to unfold upon the pivotal movement of the back rest board for converting the carriage from a chair to a bed formation.

References Cited in the file of this patent

UNITED STATES PATENTS

| | | |
|---|---|---|
| 2,254,466 | Albert | Sept. 2, 1941 |
| 2,468,587 | Chase et al. | Apr. 26, 1949 |